US012623646B2

(12) United States Patent
Sarangamath et al.

(10) Patent No.:   US 12,623,646 B2
(45) Date of Patent:        May 12, 2026

(54) EMERGENCY BRAKE SYSTEM FOR A HEAVY-DUTY VEHICLE

(71) Applicant: Volvo Truck Corporation, Gothenburg (SE)

(72) Inventors: Maheshwari Sarangamath, Karnataka (IN); Amarnath Jeyakar M R, Surandai (IN); Pravin Elangovan, Bangalore (IN); Dilip Kumar, Bengaluru (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/921,092

(22) Filed: Oct. 21, 2024

(65) Prior Publication Data

US 2025/0145131 A1      May 8, 2025

(30) Foreign Application Priority Data

Nov. 2, 2023     (EP) ..................................... 23207445

(51) Int. Cl.
　　*B60W 10/196*　　　(2012.01)
　　*B60Q 1/44*　　　　(2006.01)
　　　　　　(Continued)

(52) U.S. Cl.
　　CPC .................. *B60T 8/94* (2013.01); *B60Q 1/44* (2013.01); *B60Q 1/543* (2022.05); *B60Q 9/00* (2013.01);
　　　　　　(Continued)

(58) Field of Classification Search
　　CPC .. B60W 10/11; B60W 10/184; B60W 10/196; B60W 30/18109;
　　　　　　(Continued)

(56) References Cited

U.S. PATENT DOCUMENTS 5,139,315 A　*　8/1992　Walenty .................... B60T 7/12
　　　　　　　　　　　　　　　　　　　303/162
6,697,521 B2 *　2/2004　Islam ................... H04N 19/186
　　　　　　　　　　　　　　　　　　　375/E7.04
(Continued)

FOREIGN PATENT DOCUMENTS

CN　　　　113958630 A　　1/2022
DE　　　　3734489 A1　　4/1989
(Continued)

OTHER PUBLICATIONS

English translation of DE3734489A1; https://translationportal.epo.org; Jun. 10, 2025 (Year: 2025).*

(Continued)

*Primary Examiner* — Roger L Pang
(74) *Attorney, Agent, or Firm* — Sage Patent Group

(57)　　　　　　ABSTRACT

An emergency brake system for a heavy-duty vehicle, comprising: a pressure sensor arrangement configured to issue a first signal, S1, upon determination that the pressure in a regular brake circuit is zero or below a predefined pressure threshold value, a speed sensor configured to issue a second signal, S2, upon determination that the speed of the heavy-duty vehicle exceeds a predefined speed threshold, a parking-brake sensor configured to issue a third signal, S3, upon determination that the parking brake is in an applied state, a retarder brake configured to decelerate the heavy-duty vehicle upon activation of the retarder brake, a processing circuitry configured to activate the retarder brake upon receiving all of said three signals S1, S2 and S3.

12 Claims, 6 Drawing Sheets

(51) Int. Cl.

| | |
|---|---|
| *B60Q 1/50* | (2006.01) |
| *B60Q 9/00* | (2006.01) |
| *B60T 8/17* | (2006.01) |
| *B60T 8/88* | (2006.01) |
| *B60T 8/94* | (2006.01) |
| *B60T 13/68* | (2006.01) |
| *B60W 10/11* | (2012.01) |
| *B60W 10/184* | (2012.01) |
| *B60W 30/18* | (2012.01) |
| *B60W 50/14* | (2020.01) |

(52) U.S. Cl.

CPC ............... *B60T 8/17* (2013.01); *B60T 8/885* (2013.01); *B60T 13/683* (2013.01); *B60W 10/11* (2013.01); *B60W 10/184* (2013.01); *B60W 10/196* (2013.01); *B60W 30/18109* (2013.01); *B60T 2250/04* (2013.01); *B60T 2270/402* (2013.01); *B60W 2050/143* (2013.01); *B60W 2510/182* (2013.01); *B60W 2510/186* (2013.01); *B60W 2520/10* (2013.01); *B60W 2710/1005* (2013.01); *B60W 2710/18* (2013.01)

(58) Field of Classification Search

CPC ....... B60W 2510/186; B60W 2520/10; B60W 2510/182; B60W 2050/143; B60W 2710/1005; B60W 2710/18; B60T 8/94; B60T 8/17; B60T 8/88; B60T 8/885; B60T 13/683; B60T 2250/04; B60T 2270/402

USPC ...................... 701/53, 76; 477/184, 187, 188
See application file for complete search history.

(56) References Cited

U.S. PATENT DOCUMENTS

| | | | | |
|---|---|---|---|---|
| 12,060,051 B2 * | 8/2024 | Lee | .......................... | B60T 13/58 |
| 2006/0173599 A1 * | 8/2006 | Landes | ................... | F02D 13/04 |
| | | | | 701/50 |
| 2008/0167161 A1 * | 7/2008 | Mitchell | ......... | B60W 30/18136 |
| | | | | 477/94 |
| 2016/0144840 A1 * | 5/2016 | Pfeifer | ...................... | B60T 7/14 |
| | | | | 701/76 |
| 2019/0100218 A1 * | 4/2019 | Kim | ...................... | B60T 13/686 |
| 2021/0078556 A1 | 3/2021 | Laine et al. | | |
| 2021/0179037 A1 | 6/2021 | Heller et al. | | |

FOREIGN PATENT DOCUMENTS

| | | | |
|---|---|---|---|
| DE | 102005016001 A1 | 10/2006 | |
| DE | 102013212364 A1 | 12/2014 | |
| KR | 20190069778 A | 6/2019 | |
| WO | 8806990 A1 | 9/1988 | |

OTHER PUBLICATIONS

English translation of KR20190069778A; https://translationportal.epo.org; Jun. 10, 2025 (Year: 2025).*

Extended European Search Report, European Application No. 23207445.0, mailed Apr. 22, 2024, 7 pages.

* cited by examiner

EMERGENCY BRAKE SYSTEM FOR A HEAVY-DUTY VEHICLE

CROSS REFERENCE TO RELATED APPLICATIONS

This application claims priority to European Patent Application No. 23207445.0, filed on Nov. 2, 2023, the disclosure and content of which is incorporated by reference herein in its entirety.

TECHNICAL FIELD

The disclosure relates generally to brake systems. In particular aspects, the disclosure relates to an emergency brake system for a heavy-duty vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Heavy-duty vehicles are provided with brake circuits in which pressurized air is used for providing a braking action. Many heavy-duty vehicles have a primary and a secondary brake circuit. If brake circuit pressure fails so that satisfactory braking action is not available, the parking brake may still be used to help stopping the heavy-duty vehicle. However, the stopping distance is very long when using the parking brake. For emergency situations, it would therefore be desirable to shorten the stopping distance in case of brake circuit pressure failure.

SUMMARY

According to a first aspect of the disclosure, there is provided an emergency brake system for a heavy-duty vehicle. The emergency brake system comprises: a pressure sensor arrangement configured to determine the pressure in a regular brake circuit of a service brake system of the heavy-duty vehicle, wherein upon determination by the pressure sensor arrangement that the pressure in the regular brake circuit is zero or below a predefined pressure threshold value, the pressure sensor arrangement is configured to issue a first signal, S1, a speed sensor configured to determine the speed of the heavy-duty vehicle, wherein upon determination by the speed sensor that the speed of the heavy-duty vehicle exceeds a predefined speed threshold, the speed sensor is configured to issue a second signal, S2, a parking-brake sensor configured to determine a state of a parking brake of the heavy-duty vehicle, wherein upon determination by the parking-brake sensor that the parking brake is in an applied state, the parking-brake sensor is configured to issue a third signal, S3, a retarder brake configured to decelerate the heavy-duty vehicle upon activation of the retarder brake, a processing circuitry operatively connected to said pressure sensor arrangement, said speed sensor and said parking-brake sensor, wherein, upon receiving all of said three signals S1, S2 and S3, the processing circuitry is configured to activate the retarder brake.

The first aspect of the disclosure may seek to reduce the stopping distance of a heavy-duty vehicle in an emergency situation when the regular brake circuit to the service brakes does not work properly. A technical benefit may include that by enabling retarder braking in addition to parking braking, the stopping distance will be reduced compared to if only parking braking would be used. The processing circuitry may thus get information through the first signal S1 that the pressure in the brake circuit is too low. The pressure sensor arrangement may suitably have a pressure measuring point between a pressurized air tank and a foot brake valve of the heavy-duty vehicle. Through the second signal S2, the processing circuitry may get information that the heavy-duty vehicle is currently travelling at a relatively high speed. Through the third signal S3, the processing circuitry may get information that the parking brake has been applied. These three pieces of information, i.e., non-working brake circuit, high speed, and applied parking brake, may collectively be interpreted by the processing circuitry as an emergency situation, wherefore the processing circuitry may activate the retarder brake in order to shorten the stopping distance.

The retarder brake may be located at the propeller shaft of the heavy-duty vehicle, in particular, the retarder brake may be located between a vehicle engine/motor and a differential in the propeller shaft. Under normal driving conditions, the retarder may suitably be activated by a driver, for example by controlling a retarder switch, when the driver desires retarder braking. When the driver manually activates the retarder brake switch, the retarder brake may receive an electrical signal through the retarder switch. Activation of the retarder brake creates resistance in the propeller shaft rotation, thereby providing a braking force to the heavy-duty vehicle. The present disclosure, however, is focused on automatic activation of the retarder brake in an emergency situation, without requiring the driver to manually activate the retarder brake. By automatically adding the retarder brake during an emergency event, the stopping distance can be reduced for the heavy-duty vehicle. The retarder brake may, for example, be an electrical retarder brake or a hydraulic retarder brake. For instance, an electrical retarder brake may comprise a stator and a rotor. Electric windings in the stator may receive power from a battery, producing a magnetic field through which the rotor moves. In this case, the rotor is the propeller shaft. So, the rotation of the propeller shaft becomes restricted and the speed of the vehicle may be reduced. In a hydraulic retarder, pressurized fluid may pass opposite to the direction of the propeller shaft rotation.

Optionally, in some examples, the emergency brake system may further comprise: an auxiliary valve provided in an auxiliary brake circuit extending from an auxiliary pressure source to brake chambers of service brakes of the heavy-duty vehicle, wherein the auxiliary valve has an open state in which pressurized air is allowed to flow from the auxiliary pressure source via the auxiliary brake circuit to said brake chambers, and a closed state in which pressurized air is prevented from flowing from the auxiliary pressure source via the auxiliary brake circuit to said brake chambers, wherein, upon receiving all of said three signals S1, S2 and S3, the processing circuitry is configured to open the auxiliary valve to allow pressurized air from the auxiliary pressure source to actuate said service brakes. A technical benefit may include that by including, in addition to the parking braking and the retarder braking, this service braking by using an emergency-activated auxiliary brake circuit, the stopping distance may be shortened even further in an emergency situation.

Optionally, in some examples, the auxiliary valve may comprise an exhaust port, wherein in the closed state of the auxiliary valve, pressurized air present in the part of the auxiliary brake circuit that extends between the auxiliary valve and said brake chambers is allowed to be evacuated through the exhaust port. A technical benefit may include that, after the emergency braking, before towing the heavy-duty vehicle away for repairing the faulty brake circuit, the auxiliary valve may conveniently be closed to evacuate the pressurized air in the auxiliary brake circuit, and thus releasing the service brakes so that the heavy-duty vehicle can be conveniently towed away. Furthermore, hereby the auxiliary valve may act as an anti-compounding valve.

Optionally, in some examples, said brake chambers may form part of front axle service brakes of the heavy-duty vehicle. A technical benefit may include that, oftentimes in known vehicles, during emergency braking the front axle brakes will not work. By applying auxiliary braking to the front axle, the stopping distance may become effectively shortened. Indeed, in many existing vehicles, during emergency braking by means of the parking brake, only rear axle brakes will work since they have spring brake chambers. However, by complementing such rear axle braking with the above exemplified front axle braking (by means of the pressure in the auxiliary brake circuit), the stopping distance may be reduced.

Optionally, in some examples, the auxiliary valve may be a solenoid valve actuated into an open state by an electric signal from the processing circuitry. A technical benefit may include that a solenoid valve may be efficiently controlled by electronic signals, without requiring any additional mechanical control.

Optionally, in some examples, the emergency brake system may further comprise: a shuttle valve having three openings, a first opening to a brake chamber of the service brake of the heavy-duty vehicle, a second opening to said auxiliary brake circuit, and a third opening to the regular brake circuit, wherein when the regular brake circuit supplies pressurized air to the shuttle valve, the shuttle valve closes fluid communication between the brake chamber and the auxiliary brake circuit. A technical benefit may include that compounding issues in the shuttle valve may be counteracted. At the same time as the regular brake circuit supplies pressurized air to the shuttle valve, thus functioning properly, the auxiliary valve will be in a closed position, thus providing communication to the exhaust port and therefore pressurized air in the auxiliary brake circuit may be exhausted because. By depleting the air pressure from the auxiliary brake circuit when the regular brake circuit is functioning normally, compounding issues in the shuttle valve can be avoided.

Optionally, in some examples, the emergency brake system may further comprise: —a gear box, wherein upon receiving all of said three signals S1, S2 and S3, the processing circuitry is configured to control the gear box of the heavy-duty vehicle to downshift to a lower gear. A technical benefit may include that, for a vehicle having an automatic transmission, such a downshift to a lower gear will also contribute in reducing the stopping distance of the heavy-duty vehicle during an emergency braking event.

Optionally, in some examples, the emergency brake system may further comprise: a driver alert interface, wherein upon receiving all of said three signals S1, S2 and S3, the processing circuitry is configured to send an alert message or signal to the driver alert interface so as to alert the driver to downshift to a lower gear. A technical benefit may include that, for a vehicle having manual transmission, such an alert message may prompt the driver to downshift to a lower gear, thereby contributing in reducing the stopping distance of the heavy-duty vehicle during an emergency braking event.

Optionally, in some examples, upon receiving all of said three signals S1, S2 and S3, the processing circuitry may be configured to activate a brake taillight and/or hazard light of the heavy-duty vehicle in order to warn drivers in other vehicles. A technical benefit may include that the risk of a collision accident occurring may be reduced by warning other drivers about the emergency braking.

Optionally, in some examples, said regular brake circuit is a first regular brake circuit, wherein said pressure sensor arrangement may be further configured to determine the pressure in a second regular brake circuit of the service brake system of the heavy-duty vehicle, wherein upon determination by the pressure sensor arrangement that the pressure in both the first and the second regular brake circuit is zero or below a predefined pressure threshold value, the pressure sensor arrangement issues said first signal, S1. A technical benefit may include that the emergency brake system may be readily implemented for a heavy-duty vehicle which has regular brake circuits in the form of a primary and a secondary brake circuit. As long as one of those two brake circuits is functioning properly, the processing circuitry does not need to trigger the emergency braking. The pressure sensor arrangement may suitably include a first pressure sensor for measuring the pressure in the primary brake circuit, and a second pressure sensor for measuring the pressure in the secondary brake circuit.

Optionally, in some examples, the processing circuitry may comprise, in series connection, a first switch, a second switch and a third switch, each switch having an open state and a closed state, wherein the first, second and third switches are configured to become closed by the signals S1, S2, and S3, respectively, wherein when at least one of the first, second and third switches is open, the processing circuitry is prevented from activating the retarder brake, wherein when each one of the first, second and third switches is closed, an electrical signal is sent to the retarder brake so as to activate the retarder brake. A technical benefit may include that such series connection provides an efficient way to control the activation of the retarder brake only when all three signals have been received. As explained previously, the retarder may for example be an electrical retarder brake or a hydraulic retarder brake. Both alternatives can be activated by the electrical signal.

According to a second aspect of the disclosure, there is provided a heavy-duty vehicle. The heavy-duty vehicle comprises the emergency brake system of the first aspect, including any example thereof. The second aspect of the disclosure may seek to reduce the stopping distance of the heavy-duty vehicle in an emergency situation when the regular brake circuit to the service brakes does not work properly. A technical benefit may include that by enabling retarder braking in addition to parking braking, the stopping distance will be reduced compared to if only parking braking would be used.

Optionally, in some examples, the heavy-duty vehicle may further comprise a manual retarder brake switch which is manually controllable by a driver to activate the retarder brake independently of the emergency brake system. A technical benefit may include during normal functioning, the driver may be free to activate the retarder brake at will, whereas in an emergency event, the emergency brake system will automatically activate the retarder brake to reduce the stopping distance.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

In case of failure of the ordinary service brake system of a heavy-duty vehicle, for example due to brake circuit failure, the stopping distance will be quite long, if only the parking brake is applied in such an emergency situation. According to the teachings of the present disclosure, the stopping distance may be reduced by automatically engaging a retarder brake of the vehicle during such an emergency situation. The application of the retarder brake will contribute in shortening the stopping distance.

Figure 1:
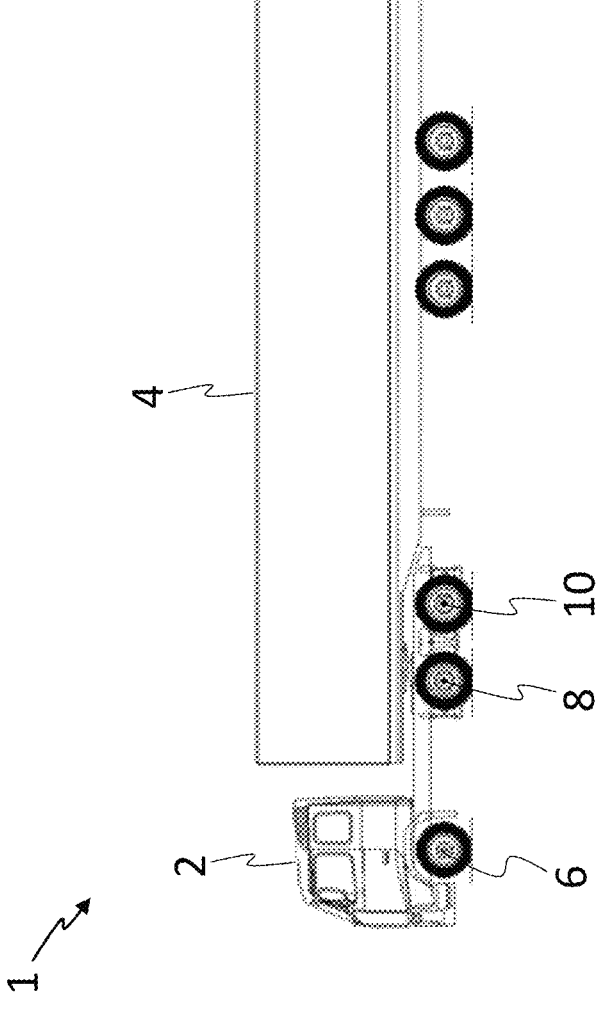
FIG. 1 schematically illustrates a vehicle according to one example of this disclosure.

FIG. 1 schematically illustrates a vehicle 1 according to one example of this disclosure. More specifically, the illustrated vehicle 1 is a heavy-duty vehicle combination which comprises a tractor unit 2 and a trailer unit 4. The tractor unit 2 has three wheel axles 6, 8, 10, each one of the wheel axles 6, 8, 10 having at least one left wheel and at least one right wheel. In this example, the tractor unit 2 has a front axle 6 and two rear axles 8, 10. One of the rear axles 8, 10 may be a lift axle. It should be understood that the teachings of this disclosure may also be implemented for vehicles without any lift axle. Additionally, the teachings of the present disclosure are not limited to a particular vehicle propulsion system, i.e., the teachings herein may be implemented for vehicles propelled by internal combustion engines, traction batteries, fuel cells, hybrid systems, etc. Furthermore, the teachings of the present disclosure may be implemented for driver-operated vehicles and for autonomous (self-driving) vehicles. The emergency brake system discussed in this disclosure may suitably be implemented in any one of the above-mentioned vehicles, including the illustrated vehicle 1. Some examples of the emergency brake system will be discussed in the following.

Figure 2:
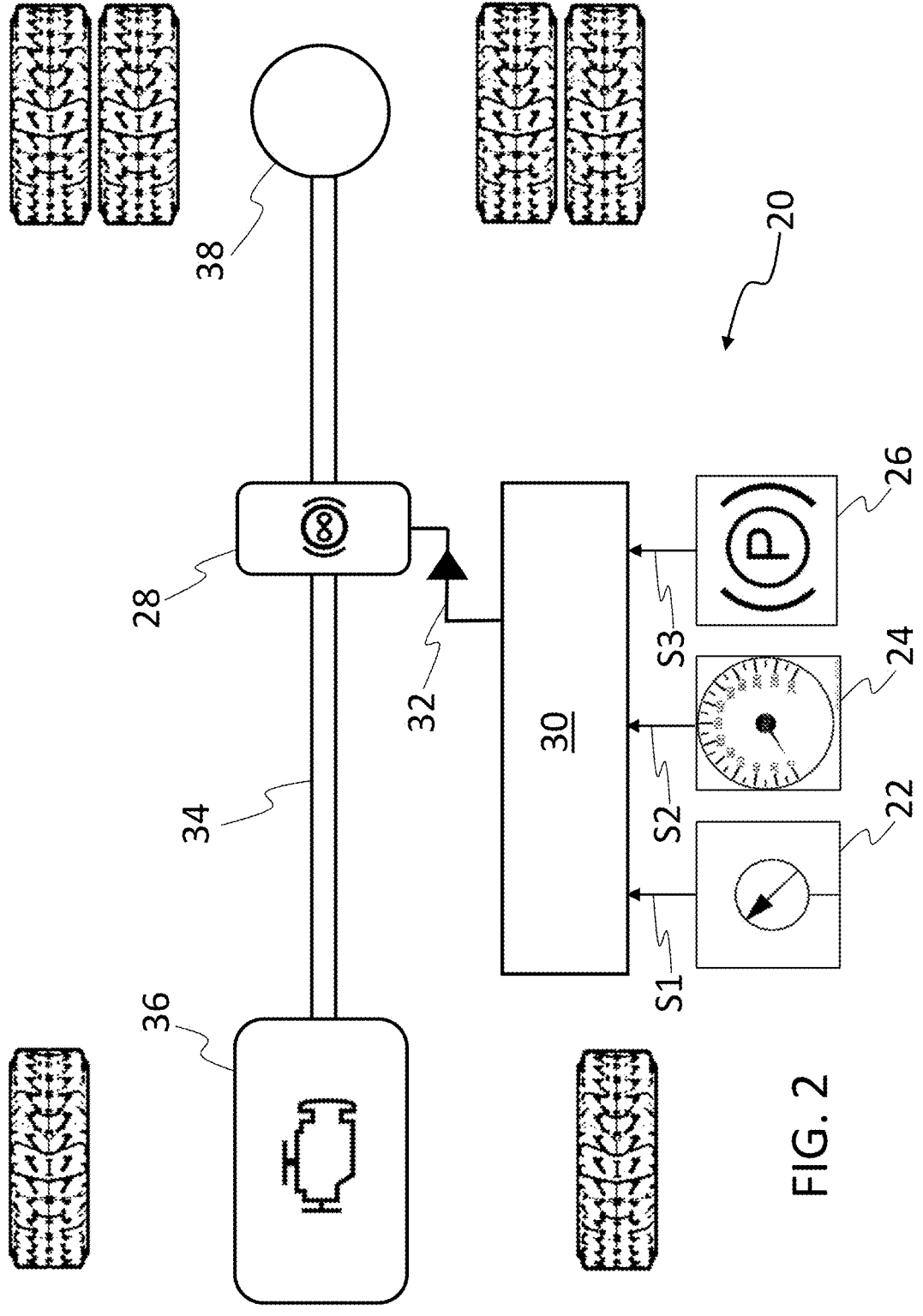
FIG. 2 schematically illustrates an emergency brake system for a heavy-duty vehicle, in accordance with one example of this disclosure.

FIG. 2 schematically illustrates an emergency brake system 20 for a heavy-duty vehicle, in accordance with one example of this disclosure. For instance, the illustrated emergency brake system 20 may be implemented in the vehicle 1 illustrated in FIG. 1. The emergency brake system 20 comprises a pressure sensor arrangement 22 which is configured to determine the pressure in a regular brake circuit of a service brake system of the heavy-duty vehicle. Upon determination by the pressure sensor arrangement 22 that the pressure in the regular brake circuit is zero or below a pre-defined pressure threshold value, the pressure sensor arrangement 22 is configured to issue a first signal S1. The emergency brake system 20 further comprises a speed sensor 24 which is configured to determine the speed of the heavy-duty vehicle. Upon determination by the speed sensor 24 that the speed of the heavy-duty vehicle exceeds a predefined speed threshold, the speed sensor 24 is configured to issue a second signal S2. The emergency brake system 20 further comprises a parking-brake sensor 26 which is configured to determine a state of a parking brake of the heavy-duty vehicle. Upon determination by the parking-brake sensor 26 that the parking brake is in an applied state, the parking-brake sensor 26 is configured to issue a third signal S3. The emergency brake system 20 further comprises a retarder brake 28 configured to decelerate the heavy-duty vehicle upon activation of the retarder brake 28. The emergency brake system 20 further comprises a processing circuitry 30 which is operatively connected to the pressure sensor arrangement 22, the speed sensor 24 and the parking-brake sensor 26. The processing circuitry 30 is configured to receive the signals S1, S2 and S3. Upon receiving all three signals S1, S2 and S3, the processing circuitry 30 is configured to activate the retarder brake. This is illustrated by an activation signal 32 from the processing circuitry 30 to the retarder brake 28.

Thus, the processing circuitry 30 is configured to activate the retarder brake 28 in an emergency situation. The processing circuitry 30 interprets a current situation as an emergency situation when all three signals S1, S2 and S3 are being received. Thus, in an emergency situation, when the service brakes do not function properly, for example due to the lack of sufficient pressure in the regular brake circuit, and the heavy-duty vehicle is travelling at a relatively high speed, and the parking-brake is being applied, then the processing circuitry 30 will activate the retarder brake 28 in order to assist the parking-brake in bringing the heavy-duty vehicle to a stop. The retarder brake 28 will reduce the stopping distance compared to if only the parking-brake would be applied in such an emergency situation.

The pressure sensor arrangement 22 may suitably have a measuring point between a pressurized air tank and a foot brake valve of the heavy-duty vehicle. Thus, the signal S1 may be generated irrespective of if the foot brake valve is activated or not.

The predefined speed threshold may, in some examples, be a fixed value. However, in other examples, it may be predefined based on certain conditions or parameters. For instance, the current load carried by the vehicle may affect at which level to set the predefined speed threshold. When the heavy-duty vehicle is carrying a relatively heavy load, a lower predefined speed threshold may be selected compared to if the same vehicle drives empty. Thus, in at least some examples, the predefined speed threshold may be selected from a set of different values, or it may be calculated by using a speed function related to one or more other parameters of the heavy-duty vehicle.

As illustrated in FIG. 2, the retarder brake 28 may be located at the propeller shaft 34 of the heavy-duty vehicle, in particular, the retarder brake 28 may be located between a vehicle engine/motor 36 and a differential 38 in the propeller shaft 34. Activation of the retarder brake 28 creates resistance in the propeller shaft 34 rotation, thereby providing a braking force to the heavy-duty vehicle. By automatically including the braking action of the retarder brake 28 during an emergency event, the stopping distance can be reduced for the heavy-duty vehicle.

Figure 3:
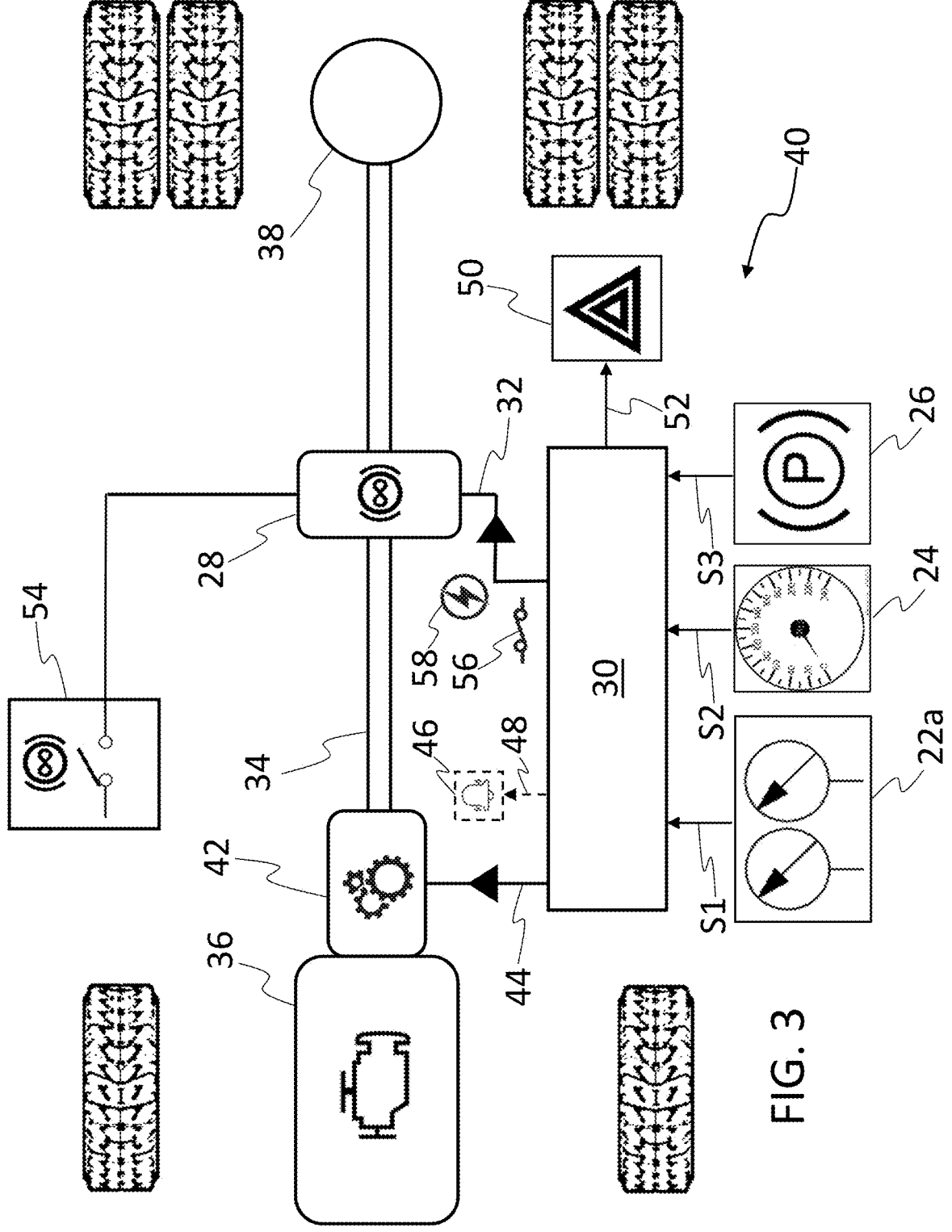
FIG. 3 schematically illustrates an emergency brake system for a heavy-duty vehicle, in accordance with another example of this disclosure.

FIG. 3 schematically illustrates an emergency brake system 40 for a heavy-duty vehicle, in accordance with another example of this disclosure. The emergency brake system 40 illustrated in FIG. 3 may include all the components previously discussed in relation to the example of FIG. 2. Similar components are denoted with corresponding reference numerals.

Many heavy-duty vehicles are provided with a primary brake circuit and a secondary brake circuit. One of the brake circuits may be configured to cause braking of rear wheels, while the other one of the brake circuits may be configured to cause braking of the front wheels. As illustrated schematically in FIG. 3, the pressure sensor arrangement 22*a* of this example of an emergency brake system 40 may suitably be configured to determine the pressure, not only in the primary brake circuit, but also in a secondary brake circuit of the service brake system of the heavy-duty vehicle. Upon determination by the pressure sensor arrangement 22*a* that the pressure in both the primary and the secondary brake circuit is zero or below a predefined threshold value, the pressure sensor arrangement 22*a* issues the first signal S1. Both the primary brake circuit and the secondary brake circuit are regular brake circuits (as opposed to the auxiliary brake circuit discussed in this disclosure). Thus, it should be understood that in this disclosure when discussing a first regular brake circuit and a second regular brake circuit, they may be in the form of a primary brake circuit and a secondary brake circuit, respectively; or in the form of a secondary brake circuit and a primary brake circuit, respectively.

Additionally, as illustrated in FIG. 3, the emergency brake system 40 may further comprise a gear box 42 operatively connected to the propeller shaft 34. An existing gear box 42 of the vehicle may suitably be incorporated to form part of the emergency brake system 40. Upon receiving all three signals S1, S2 and S3 the processing circuitry 30 may, in addition to activating the retarder brake 28, suitably be configured to control the gear box 42 of the heavy-duty vehicle to downshift to a lower gear. This is illustrated by a gear shifting signal 44 transmitted from the processing circuitry 30 to the gear box 42. By such downshifting, the stopping distance may be reduced even more. Such an automatic downshifting may be suitable for heavy-duty vehicles comprising automatic transmission. In other examples, in particular for heavy-duty vehicles comprising manual transmission, the emergency brake system 40 may, as illustrated with dashed lines, comprise a driver alert interface 46. Upon receiving all of said three signals S1, S2 and S3, the processing circuitry 30 may be configured to send an alert message 48 or signal to the driver alert interface 46 so as to alert the driver to downshift to a lower gear.

In some examples, upon receiving all of said three signals S1, S2 and S3, the processing circuitry 30 may be configured to activate a brake taillight and/or hazard light 50 of the heavy-duty vehicle in order to warn drivers in other vehicles. This is illustrated by an activation signal 52 sent from the processing circuitry 30 to the hazard light 50.

FIG. 3 also illustrates that a heavy-duty vehicle may also comprise a manual retarder brake switch 54 which is manually controllable by a driver to activate the retarder brake 28 independently of the emergency brake system 40. Thus, under normal operating conditions, the driver may when desired activate the retarder brake 28 by controlling the manual retarder brake switch 54, which is not part of the emergency brake system 40. However, in an emergency situation, when the driver is applying the parking brake, the emergency brake system 40 will automatically activate the retarder brake 28 without the driver needing to control the manual retarder brake switch 54.

As symbolically indicated in FIG. 3, the processing circuitry 30 may suitably include switches 56 which, when they are closed, activate/energize 58 the retarder brake 28, and suitably activate also at least some of the other components. An example of such a switch-based activation is illustrated in the ladder diagrams of FIGS. 4A-4B.

Figures 4A, 4B:
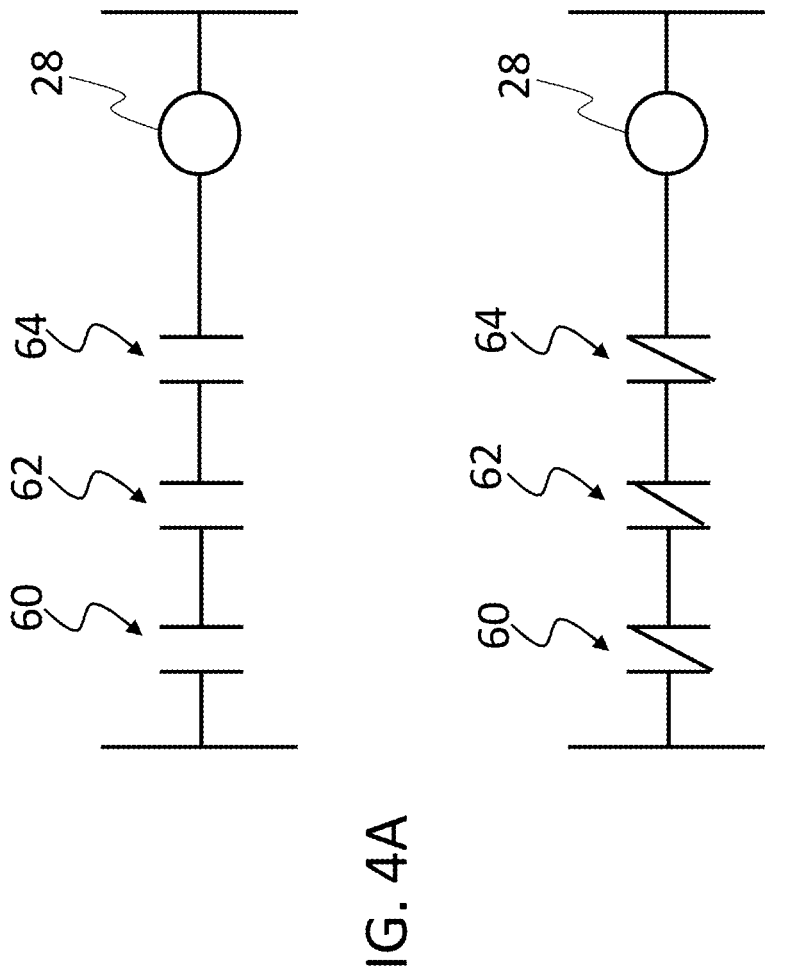
FIGS. 4A-4B show ladder diagrams for illustrating an example of implementing the operation of a processing circuitry of the emergency brake system in accordance with one example.

FIGS. 4A-4B show ladder diagrams for illustrating an example of implementing the operation of a processing circuitry of the emergency brake system in accordance with one example (such as processing circuitry 30 of energy brake systems 20, 40 in FIGS. 2 and 3). As illustrated in FIGS. 4A-4B, the processing circuitry may comprise, in series connection, a first switch 60, a second switch 62 and a third switch 64. Each switch 60, 62, 64 has an open state and a closed state. In FIG. 4A all three switches 60, 62, 64 are shown in their open states, whereas in FIG. 4B all three switches 60, 62, 64 are shown in their closed states. The first switch 60 is configured to become closed by the first signal S1, i.e., the signal from the pressure sensor arrangement (e.g., pressure sensor arrangement 22, 22*a* in FIGS. 2 and 3). The second switch 62 is configured to become closed by the second signal S2, i.e., from the speed sensor (e.g., speed sensor 24 in FIGS. 2 and 3). The third switch 64 is configured to become closed by the third signal S3, i.e., from the parking-brake sensor (e.g., the parking-brake sensor 24 in FIGS. 2 and 3). When at least one of the first, second and third switches 60, 62, 64 is open, the electrical signal cannot come through to the retarder brake 28, and the retarder brake 28 will therefore not become energized. Thus, when at least one of the first, second and third switches 60, 62, 64 is open, the processing circuitry is prevented from activating the retarder brake 28. However, when each one of the first, second and third switches 60, 62, 64 is closed (as in FIG. 4B), an electrical signal is allowed to reach the retarder brake 28 so as to activate the retarder brake 28.

In other examples the processing circuitry may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

Figure 5:
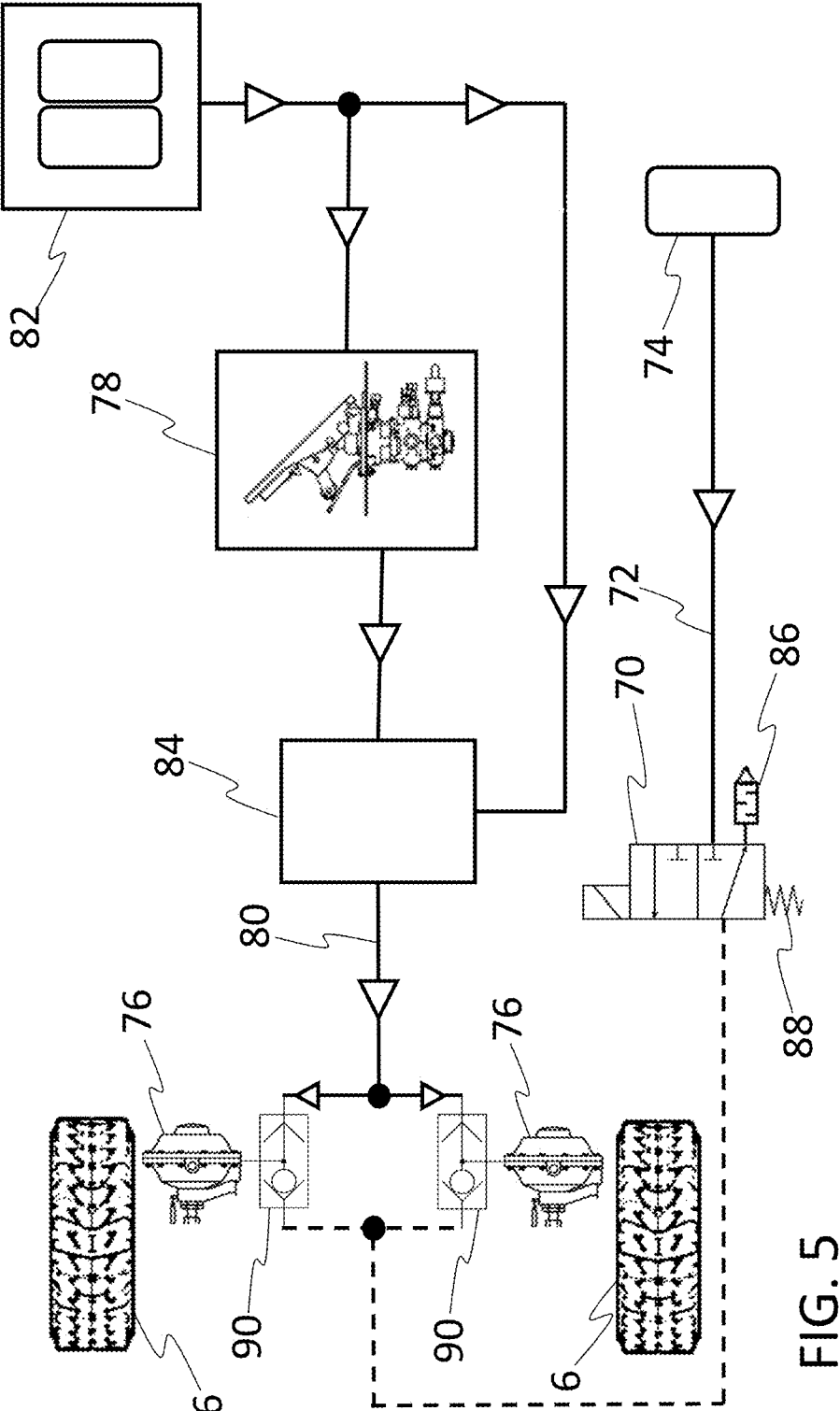
FIGS. 5 and 6 illustrate that an auxiliary valve provided in an auxiliary brake circuit may be implemented in an emergency brake system, in accordance with an example of this disclosure.
Figure 6:
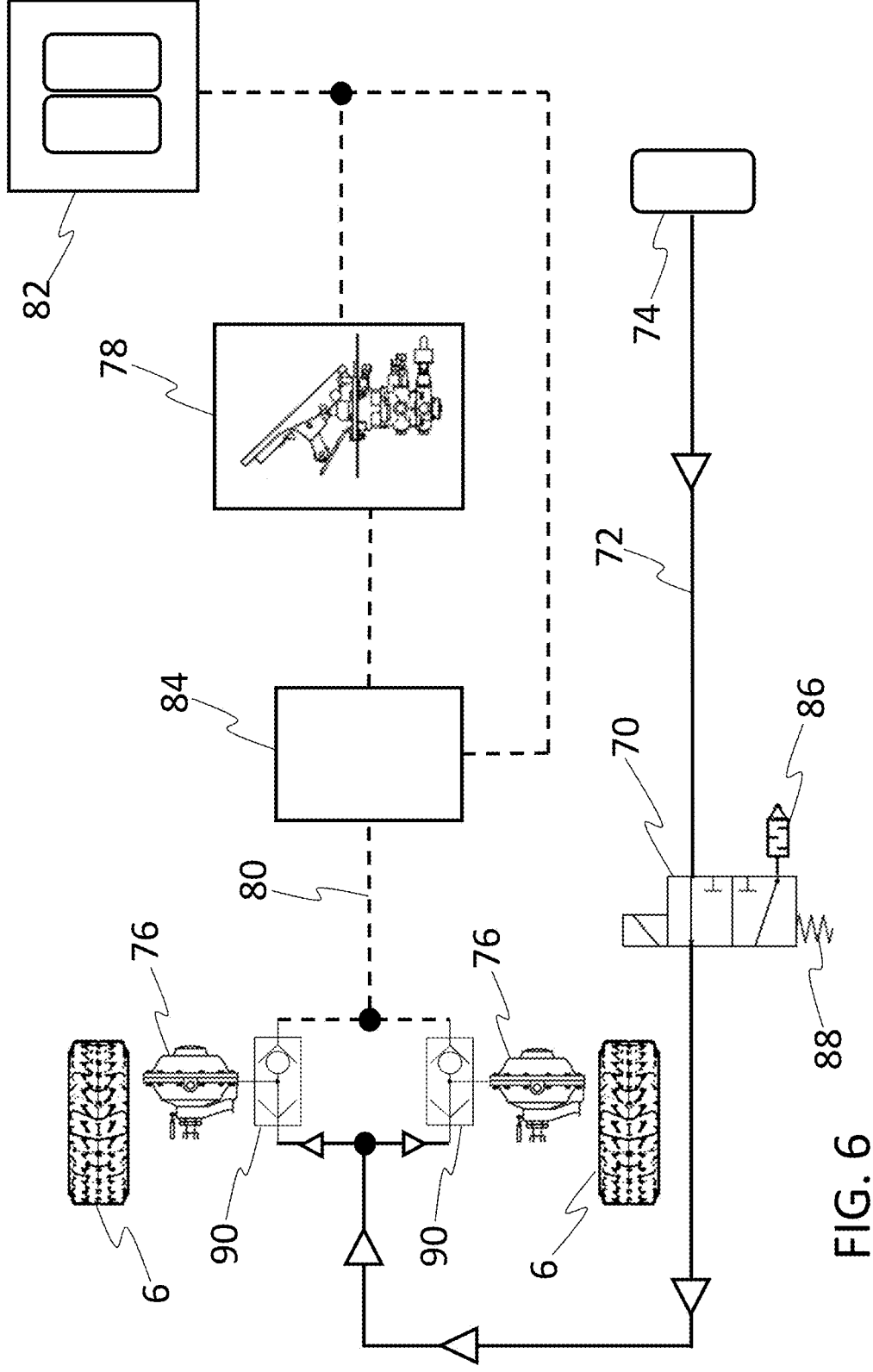

FIGS. 5 and 6 illustrate that an auxiliary valve 70 provided in an auxiliary brake circuit 72 may be implemented in an emergency brake system, in accordance with an example of this disclosure. For instance, the auxiliary valve 70 may be comprised in the examples of the emergency brake system 20, 40 discussed in relation to FIGS. 2 and 3, or in any other example of the emergency brake system of this disclosure.

FIG. 5 illustrates the auxiliary valve 70 in a closed state. FIG. 6 illustrates the auxiliary valve 70 in an open state. The auxiliary brake circuit extends from an auxiliary pressure source 74, such as an auxiliary pressurized tank, compressor, etc., to brake chambers 76 of service brakes of the heavy-duty vehicle. The auxiliary valve 70 is provided in the auxiliary brake circuit 72 and has an open state (FIG. 6) in which pressurized air is allowed to flow from the auxiliary pressure source 74 via the auxiliary brake circuit 72 to said brake chambers 76, and a closed state (FIG. 5) in which pressurized air is prevented from flowing from the auxiliary pressure source 74 via the auxiliary brake circuit 72 to said brake chambers 76. The auxiliary valve 70 may suitably be controllable by the processing circuitry of the emergency brake system of this disclosure. For instance, the processing circuitry 30 discussed in relation to FIGS. 2 and 3 (or in relation to any other example of this disclosure) may suitably be configured to also control the state of the auxiliary valve 70. Thus, upon receipt of all of said three signals S1, S2 and S3, the processing circuitry (not shown in FIGS. 5 and 6) may be configured to open the auxiliary valve 70 to allow pressurized air from the auxiliary pressure source 74 to actuate the service brakes.

FIG. 5 illustrates that under normal operating conditions, when a driver applies the foot brake valve 78 pressurized air may be supplied, via a regular brake circuit 80 (such as a primary or secondary brake circuit) to the brake chambers 76 from one or more pressurized air tanks 82 (suitably via an electronic brake system 84) so as to cause the service brakes to apply a braking force. Under such normal operating conditions, the auxiliary valve 70 is in its closed state, and pressurized air cannot pass from the auxiliary pressure source 74 to the brake chambers 76 (as illustrated by the dashed line). However, in an emergency condition when the regular (primary and/or secondary) brake circuit 80 does not function properly, such that the pressure is too low, then the processing circuitry will upon reception of signals S1, S2 and S3, control the auxiliary valve 70 to move it into an open state, so as to allow the pressurized air to flow from the auxiliary pressure source 74 to the brake chambers 76 (as illustrated in FIG. 5). Hereby, auxiliary braking is provided which further reduces the stopping distance in an emergency situation. In this example, only the front wheels 6 are illustrated, each front wheel 6 being provided with a respective brake chamber 76. It should, however, be understood that the corresponding implementation may also be provided for other wheels, such as rear wheels.

With reference to FIG. 5, the auxiliary valve 70 may comprise an exhaust port 86. In the closed state of the auxiliary valve 70, pressurized air which is present in the part of the auxiliary brake circuit 72 that extends between the auxiliary valve 70 and the brake chambers 76 is allowed to be evacuated through the exhaust port 86. After an emergency stop, in which the auxiliary valve 70 was opened to provide the auxiliary braking, the auxiliary valve 70 may then be set to the closed state to in order to evacuate the pressurized air from the brake chambers 76 out through the exhaust port 86 (via the part of the auxiliary brake circuit 72 that extends between the brake chambers 76 and the auxiliary valve 70). Hereby, towing away of the vehicle is facilitated. The auxiliary valve 70 may also act as an anti-compounding valve.

The auxiliary valve 70 may suitably be a solenoid valve which is actuated into the open state by an electric signal from the processing circuitry. The electric signal may for instance be generated or allowed to pass through switches 60, 62, 64 as illustrated in FIG. 4B. However, in other examples, the processing circuitry may transmit the electric signal to the solenoid valve in different manner. Thus, any implementation in which the processing circuitry may cause the solenoid valve to become energized in an emergency situation (as manifested by the reception of signals S1, S2 and S3), is conceivable for implementing the auxiliary braking. The solenoid valve (auxiliary valve 70) may suitably be provided with a spring 88 which biases the solenoid valve to a normally closed state (FIG. 5). When the solenoid valve is energized, it is provided with a force that overcomes the biasing force of the spring 88 and moves the solenoid valve to the open state (FIG. 6).

As illustrated in FIGS. 5 and 6, the emergency brake system may further comprise a respective shuttle valve 90 associated with each brake chamber 76. Each shuttle valve 90 has three openings, a first opening to the brake chamber 76 of the service brake of the heavy-duty vehicle, a second opening to said auxiliary brake circuit 72, and a third opening to the regular brake circuit 80. When the regular brake circuit supplies pressurized air to the shuttle valve (FIG. 5), the shuttle valve 90 closes fluid communication between the brake chamber 76 and the auxiliary brake circuit 72. In contrast, when the auxiliary brake circuit 72 supplies pressurized air to the shuttle valve 90 (FIG. 6), the shuttle valve closes fluid communication between the brake chamber 76 and the regular brake circuit 80.

Example 1: An emergency brake system for a heavy-duty vehicle, comprising:—a pressure sensor arrangement configured to determine the pressure in a regular brake circuit of a service brake system of the heavy-duty vehicle, wherein upon determination by the pressure sensor arrangement that the pressure in the regular brake circuit is zero or below a predefined pressure threshold value, the pressure sensor arrangement is configured to issue a first signal, S1, a speed sensor configured to determine the speed of the heavy-duty vehicle, wherein upon determination by the speed sensor that the speed of the heavy-duty vehicle exceeds a predefined speed threshold, the speed sensor is configured to issue a second signal, S2, a parking-brake sensor configured to determine a state of a parking brake of the heavy-duty vehicle, wherein upon determination by the parking-brake sensor that the parking brake is in an applied state, the parking-brake sensor is configured to issue a third signal, S3, a retarder brake configured to decelerate the heavy-duty vehicle upon activation of the retarder brake, a processing circuitry operatively connected to said pressure sensor arrangement, said speed sensor and said parking-brake sensor, wherein, upon receiving all of said three signals S1, S2 and S3, the processing circuitry is configured to activate the retarder brake.

Example 2: The emergency brake system of example 1, further comprising: an auxiliary valve provided in an auxiliary brake circuit extending from an auxiliary pressure source to brake chambers of service brakes of the heavy-duty vehicle, wherein the auxiliary valve has an open state in which pressurized air is allowed to flow from the auxiliary pressure source via the auxiliary brake circuit to said brake chambers, and a closed state in which pressurized air is prevented from flowing from the auxiliary pressure source via the auxiliary brake circuit to said brake chambers, wherein, upon receiving all of said three signals S1, S2 and S3, the processing circuitry is configured to open the auxiliary valve to allow pressurized air from the auxiliary pressure source to actuate said service brakes.

Example 3: The emergency brake system of example 2, wherein the auxiliary valve comprises an exhaust port, wherein in the closed state of the auxiliary valve, pressurized air present in the part of the auxiliary brake circuit that extends between the auxiliary valve and said brake chambers is allowed to be evacuated through the exhaust port.

Example 4: The emergency brake system of any one of examples 2-3, wherein said brake chambers form part of front axle service brakes of the heavy-duty vehicle.

Example 5: The emergency brake system of any one of examples 2-4, wherein the auxiliary valve is a solenoid valve actuated into an open state by an electric signal from the processing circuitry.

Example 6: The emergency brake system of any one of examples 2-5, further comprising: a shuttle valve having three openings, a first opening to a brake chamber of the service brake of the heavy-duty vehicle, a second opening to said auxiliary brake circuit, and a third opening to the regular brake circuit, wherein when the regular brake circuit supplies pressurized air to the shuttle valve, the shuttle valve closes fluid communication between the brake chamber and the auxiliary brake circuit.

Example 7: The emergency brake system of any of examples 1-6, further comprising: a gear box, wherein upon receiving all of said three signals S1, S2 and S3, the processing circuitry is configured to control the gear box of the heavy-duty vehicle to downshift to a lower gear.

Example 8: The emergency brake system of any of examples 1-6, further comprising: a driver alert interface, wherein upon receiving all of said three signals S1, S2 and S3, the processing circuitry is configured to send an alert message or signal to the driver alert interface so as to alert the driver to downshift to a lower gear.

Example 9: The emergency brake system of any one of examples 1-8, wherein upon receiving all of said three signals S1, S2 and S3, the processing circuitry is configured to activate a brake taillight and/or hazard light of the heavy-duty vehicle in order to warn drivers in other vehicles.

Example 10: The emergency brake system of any one of examples 1-9, wherein the regular brake circuit is a first regular brake circuit, wherein said pressure sensor arrangement is further configured to determine the pressure in a second regular brake circuit of the service brake system of the heavy-duty vehicle, wherein upon determination by the pressure sensor arrangement that the pressure in both the first and the second regular brake circuit is zero or below a predefined pressure threshold value, the pressure sensor arrangement issues said first signal, S1.

Example 11: The emergency brake system of any one of examples 1-10, wherein the processing circuitry comprises, in series connection, a first switch, a second switch and a third switch, each switch having an open state and a closed state, wherein the first, second and third switches are configured to become closed by the signals S1, S2, and S3, respectively, wherein when at least one of the first, second and third switches is open, the processing circuitry is prevented from activating the retarder brake, wherein when each one of the first, second and third switches is closed, an electrical signal is sent to the retarder brake so as to activate the retarder brake.

Example 12: A heavy-duty vehicle comprising the emergency brake system according to any of examples 1-11.

Example 13: The heavy-duty vehicle of example 12, further comprising a manual retarder brake switch which is manually controllable by a driver to activate the retarder brake independently of the emergency brake system.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. An emergency brake system for a heavy-duty vehicle, comprising:
a pressure sensor arrangement configured to determine the pressure in a first regular brake circuit of a service brake system of the heavy-duty vehicle, wherein said pressure sensor arrangement is further configured to determine the pressure in a second regular brake circuit of the service brake system of the heavy-duty vehicle, wherein upon determination by the pressure sensor arrangement that the pressure in each of the first and the second regular brake circuits is zero or below a predefined pressure threshold value, the pressure sensor arrangement is configured to issue a first signal, S1;
a speed sensor configured to determine the speed of the heavy-duty vehicle, wherein upon determination by the speed sensor that the speed of the heavy-duty vehicle exceeds a predefined speed threshold, the speed sensor is configured to issue a second signal, S2;
a parking-brake sensor configured to determine a state of a parking brake of the heavy-duty vehicle, wherein upon determination by the parking-brake sensor that the parking brake is in an applied state, the parking-brake sensor is configured to issue a third signal, S3;

a retarder brake configured to decelerate the heavy-duty vehicle upon activation of the retarder brake; and processing circuitry operatively connected to said pressure sensor arrangement, said speed sensor and said parking-brake sensor, wherein, upon receiving all of said three signals S1, S2 and S3, the processing circuitry is configured to activate the retarder brake.

2. The emergency brake system of claim 1, further comprising:

an auxiliary valve provided in an auxiliary brake circuit extending from an auxiliary pressure source to brake chambers of service brakes of the heavy-duty vehicle, wherein the auxiliary valve has an open state in which pressurized air is allowed to flow from the auxiliary pressure source via the auxiliary brake circuit to said brake chambers, and a closed state in which pressurized air is prevented from flowing from the auxiliary pressure source via the auxiliary brake circuit to said brake chambers, wherein, upon receiving all of said three signals S1, S2 and S3, the processing circuitry is configured to open the auxiliary valve to allow pressurized air from the auxiliary pressure source to actuate said service brakes.

3. The emergency brake system of claim 2, wherein the auxiliary valve comprises an exhaust port, wherein in the closed state of the auxiliary valve, pressurized air present in the part of the auxiliary brake circuit that extends between the auxiliary valve and said brake chambers is allowed to be evacuated through the exhaust port.

4. The emergency brake system of claim 2, wherein said brake chambers form part of front axle service brakes of the heavy-duty vehicle.

5. The emergency brake system of claim 2, wherein the auxiliary valve is a solenoid valve actuated into an open state by an electric signal from the processing circuitry.

6. The emergency brake system of claim 2, further comprising:

a shuttle valve having three openings, a first opening to a brake chamber of the service brake of the heavy-duty vehicle, a second opening to said auxiliary brake circuit, and a third opening to the first regular brake circuit, wherein when the first regular brake circuit supplies pressurized air to the shuttle valve, the shuttle valve closes fluid communication between the brake chamber and the auxiliary brake circuit.

7. The emergency brake system of claim 1, further comprising:

a driver alert interface, wherein upon receiving all of said three signals S1, S2 and S3, the processing circuitry is configured to send an alert message or signal to the driver alert interface so as to alert the driver to downshift to a lower gear.

8. The emergency brake system of claim 1, wherein upon receiving all of said three signals S1, S2 and S3, the processing circuitry is configured to activate a brake taillight and/or hazard light of the heavy-duty vehicle in order to warn drivers in other vehicles.

9. A heavy-duty vehicle comprising the emergency brake system according to claim 1.

10. The heavy-duty vehicle of claim 9, further comprising a manual retarder brake switch which is manually controllable by a driver to activate the retarder brake independently of the emergency brake system.

11. An emergency brake system for a heavy-duty vehicle, comprising:

a pressure sensor arrangement configured to determine the pressure in a regular brake circuit of a service brake system of the heavy-duty vehicle, wherein upon determination by the pressure sensor arrangement that the pressure in the regular brake circuit is zero or below a predefined pressure threshold value, the pressure sensor arrangement is configured to issue a first signal, S1;

a speed sensor configured to determine the speed of the heavy-duty vehicle, wherein upon determination by the speed sensor that the speed of the heavy-duty vehicle exceeds a predefined speed threshold, the speed sensor is configured to issue a second signal, S2;

a parking-brake sensor configured to determine a state of a parking brake of the heavy-duty vehicle, wherein upon determination by the parking-brake sensor that the parking brake is in an applied state, the parking-brake sensor is configured to issue a third signal, S3;

a retarder brake configured to decelerate the heavy-duty vehicle upon activation of the retarder brake;

processing circuitry operatively connected to said pressure sensor arrangement, said speed sensor and said parking-brake sensor, wherein, upon receiving all of said three signals S1, S2 and S3, the processing circuitry is configured to activate the retarder brake; and a gear box, wherein upon receiving all of said three signals S1, S2 and S3, the processing circuitry is configured to control the gear box of the heavy-duty vehicle to downshift to a lower gear.

12. An emergency brake system for a heavy-duty vehicle, comprising:

a pressure sensor arrangement configured to determine the pressure in a regular brake circuit of a service brake system of the heavy-duty vehicle, wherein upon determination by the pressure sensor arrangement that the pressure in the regular brake circuit is zero or below a predefined pressure threshold value, the pressure sensor arrangement is configured to issue a first signal, S1;

a speed sensor configured to determine the speed of the heavy-duty vehicle, wherein upon determination by the speed sensor that the speed of the heavy-duty vehicle exceeds a predefined speed threshold, the speed sensor is configured to issue a second signal, S2;

a parking-brake sensor configured to determine a state of a parking brake of the heavy-duty vehicle, wherein upon determination by the parking-brake sensor that the parking brake is in an applied state, the parking-brake sensor is configured to issue a third signal, S3;

a retarder brake configured to decelerate the heavy-duty vehicle upon activation of the retarder brake; and processing circuitry operatively connected to said pressure sensor arrangement, said speed sensor and said parking-brake sensor, wherein, upon receiving all of said three signals S1, S2 and S3, the processing circuitry is configured to activate the retarder brake, wherein the processing circuitry comprises, in series connection, a first switch, a second switch and a third switch, each switch having an open state and a closed state, wherein the first, second and third switches are configured to become closed by the signals S1, S2, and S3, respectively, wherein when at least one of the first, second and third switches is open, the processing circuitry is prevented from activating the retarder brake, wherein when each one of the first, second and third switches is closed, an electrical signal is sent to the retarder brake so as to activate the retarder brake.

* * * * *